United States Patent
Rios et al.

(10) Patent No.: US 11,667,572 B2
(45) Date of Patent: *Jun. 6, 2023

(54) SYSTEM AND METHOD FOR IMPROVED PORTLAND CEMENT BASECOAT PLASTERS

(71) Applicants: Manuel Joe Rios, San Jose, CA (US); Anthony Michael Rios, San Jose, CA (US)

(72) Inventors: Manuel Joe Rios, San Jose, CA (US); Anthony Michael Rios, San Jose, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/222,094

(22) Filed: Apr. 5, 2021

(65) Prior Publication Data
US 2021/0253479 A1    Aug. 19, 2021

Related U.S. Application Data

(62) Division of application No. 16/564,276, filed on Sep. 9, 2019, now Pat. No. 10,995,033, which is a division of application No. 14/334,591, filed on Jul. 17, 2014, now abandoned.

(60) Provisional application No. 61/847,352, filed on Jul. 17, 2013.

(51) Int. Cl.
*C04B 28/04*    (2006.01)
*C04B 111/00*   (2006.01)

(52) U.S. Cl.
CPC ..... *C04B 28/04* (2013.01); *C04B 2111/00517* (2013.01)

(58) Field of Classification Search
CPC .......... C04B 28/04; C04B 2111/00517; Y02W 30/91
See application file for complete search history.

(56) References Cited

U.S. PATENT DOCUMENTS

| | | | | |
|---|---|---|---|---|
| 3,869,295 A * | 3/1975 | Bowles | ................... | C04B 28/02 521/55 |
| 4,245,054 A * | 1/1981 | Hohwiller | ............... | C04B 28/02 521/84.1 |
| 2008/0314295 A1* | 12/2008 | Guevara | ................. | C04B 28/02 106/668 |

* cited by examiner

*Primary Examiner* — Kara B Boyle
(74) *Attorney, Agent, or Firm* — Mayer & Williams, PC

(57) ABSTRACT

Systems and methods according to present principles enhance aspects of applied plaster coats. In particular, the materials include a synthetic substitute aggregate (SSA), added to a cementitious base coat, for a plastering step prior to application of stucco or acrylic synthetic finishes or finish coats. The addition of SSA to a pre-blended cementitious base coat creates a light weight product which in some implementations is highly advantageous for the plastering industry.

6 Claims, 3 Drawing Sheets

SYSTEM AND METHOD FOR IMPROVED PORTLAND CEMENT BASECOAT PLASTERS

CROSS-REFERENCE TO RELATED APPLICATIONS

This application is a divisional of U.S. Ser. No. 16/564,276, filed Sep. 9, 2019, which is a divisional of U.S. Ser. No. 14/334,591, filed Jul. 17, 2014, which claims the benefit of priority to U.S. Provisional Patent Application Ser. No. 61/847,352, filed Jul. 17, 2013, entitled "SYSTEM AND METHOD FOR IMPROVED PLASTERS", owned by the assignee of the present application and herein incorporated by reference in its entirety.

BACKGROUND OF THE INVENTION

Stucco is a material made of an aggregate, a binder, and water. Stucco is often used to cover construction materials including concrete, cinderblock, and other such walls. While capable of being applied directly over solid masonry, brick, or stone surfaces, modern applications typically employ a reinforcement lattice or lath attached to and spanning between structural supports such as in metal or wood framing, which is covered in a plaster. The lath adds support and tensile strength for the plaster.

In many cases over lath, stucco is applied utilizing a three coat system: the scratch coat, the brown coat, and the finish coat. Two base coats of plaster (scratch and brown) are either hand applied or machine sprayed. The finish coat can also be hand or machine applied depending on texture desired.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

Materials according to present principles enhance aspects of applied plaster coats. In particular, the materials include a synthetic substitute aggregate (SSA), added to a cementitious base coat, for a plastering step prior to application of stucco or acrylic synthetic finishes or finish coats. The addition of SSA to a pre-blended cementitious base coat creates a light weight product which in some implementations is highly advantageous for the plastering industry.

In one aspect, the invention is directed towards a plaster product, including: a first aggregate including sand; synthetic substitute aggregate, the synthetic substitute aggregate weighing less than 55% by volume compared to the first aggregate; and a binder. The first aggregate constitutes between about 40 and 70% by weight of the plaster product, the synthetic substitute aggregate and the first aggregate occupy the same volume within the plaster product plus or minus 25%, and the binder constitutes between about 20 and 40% by weight of the plaster product.

Implementations of the invention may include one or more of the following.

The synthetic substitute aggregate may include expanded polystyrene, and the binder may include Portland cement and optional lime. The first aggregate may be selected from the group consisting of: calcium carbonate, silica, quartz, and combinations thereof. An amount of the first aggregate and an amount of the synthetic substitute aggregate may occupy equal volumes plus or minus 25%, 10%, or 5%. An amount of the first aggregate is, by volume, between about 20% and 70% of an amount of the plaster product.

In another aspect, the invention is directed towards a method of making a plaster product, including: mixing together a first aggregate, a synthetic substitute aggregate, and a binder; and disposing the mixture in a storage unit or bag.

Implementations of the invention may include one or more of the following. The synthetic substitute aggregate may include expanded polystyrene. The binder may include Portland cement and optionally lime. The first aggregate may be selected from the group consisting of: calcium carbonate, silica, quartz, and combinations thereof. The mixing may include mixing an amount of the first aggregate with an equal volume, plus or minus 25% (or 10% or 5%), of an amount of the synthetic substitute aggregate. An amount of the first aggregate may be, by volume, between about 20% and 70% of an amount of the synthetic substitute aggregate. The ratios of constituent components may be such that the first aggregate constitutes between about 40 and 70% by weight of the plaster product and the binder constitutes between about 20 and 40% by weight of the plaster product. Other ratios will also be understood.

In yet another aspect, the invention is directed towards a product made by the above method.

Advantages of the invention may include one or more of the following. Significant reductions in weight may be seen by certain implementations of materials according to present principles, leading to, e.g., significant weight reduction in bags, further leading to significant environmental and health advantages. Other advantages will be apparent from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

Figure 1:
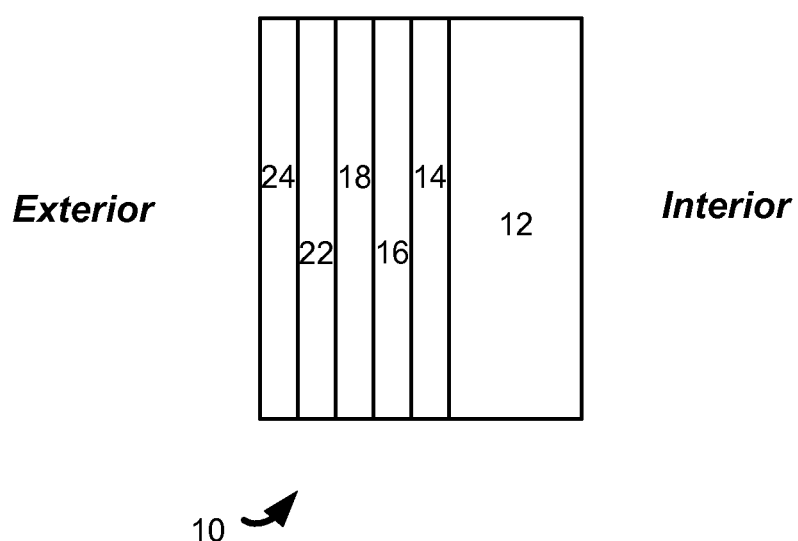
FIG. 1 shows a substrate and various layers in which systems and methods according to present principles may be employed.

As noted above, in many cases, stucco is applied utilizing a three coat system: the scratch coat, the brown coat, and the finish coat. Referring to FIG. 1, an initial step is that a a specified substrate 12 is covered by a weather barrier 14 and lath 16. Then two base coats of plaster (scratch and brown) are either hand applied or machine sprayed over the lath. In FIG. 1 these are shown by the scratch coat 18 and the brown coat 22. A finish coat 24 can also be hand or machine applied depending on texture desired.

Figure 2:
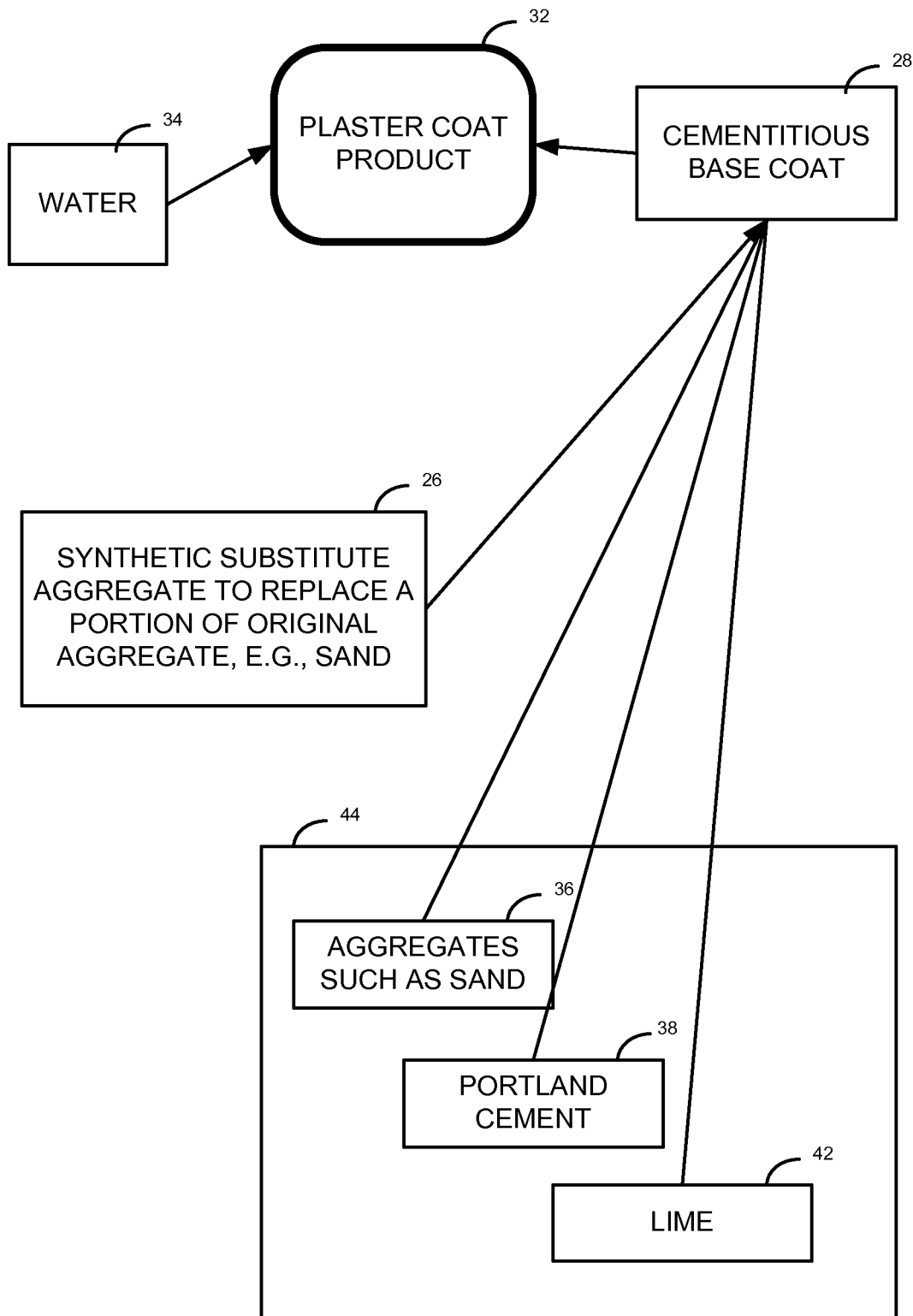
FIG. 2 shows a diagram of constituent components of a plaster product according to present principles.

Materials according to present principles in particular enhance aspects of the applied plaster coats. In particular, and according to FIG. 2, the materials include a synthetic substitute aggregate (SSA) 26, added to a cementitious base coat 28, to create a plaster coat product 32 to apply in a plastering step prior to application of stucco or acrylic synthetic finishes. The addition of SSA to a pre-blended cementitious base coat creates a light weight product which is highly advantageous for the plastering industry.

One type of cementitious base coat that may be employed is Premier UNO® plaster, which is a proprietary formulation available from Rivers del Rey, Inc., of Gilroy, Calif. It will be understood that many other types of cementitious base coats may also benefit from the addition of an SSA. As used here, a cementitious base coat 28 is a blend of raw materials, generally made according to Plastering Industry Standards, and generally including recognized aggregates 36, such as sand, cement 38 such as Portland cement, and, e.g., lime 42 when specified. The components are blended together to create a scratch and/or brown coat 44. This blend, mixed with water 34 such as potable and mixed in a traditional mixer, is then applied by either "Hawk and Trowel" (hand) or by machine (pump) as a plaster coat product according to present principles. The mixture per se may be deemed a combination scratch and brown coat, requiring only one application rather than two separate applications, one for each coat.

In one implementation, the scratch and brown coat, once applied over approved lath, is generally about ⅜" to ⅞" in thickness, e.g., about ½" to ⅞" in thickness, e.g., about ¾" to ⅞" in thickness. At a specified full thickness, the base coat serves to not only "plumb" the vertical wall but also and importantly to create a base to receive the specified finish coat application; i.e. stucco and synthetic finishes. It will be understood that other thicknesses may also be employed, e.g., the scratch and brown coats can be thinner (½") or thicker (1") depending upon the surface being covered and the results to be achieved.

It is noted that traditionally the aggregate (termed here in some instances as a 'first aggregate') used in base coat blends has included an industry-approved and recognized aggregate, such as sand. Such may be of a variety of different types depending in many instances of the geographic region in which the sand is produced. Meeting industry-recognized ASTM C897 and/or ASTM C144 for the purpose of the creation of a base coat, the types of sand can include Calcium Carbonate, Silica, or Quartz, and the like. In materials according to present principles, a sized lightweight SSA, that consists of manufactured or recycled processed and coated EPS (expanded polystyrene) meeting Plastering Industry recognized ASTM and ICC standards (AC 408 and AC 11) such as CityMix and ReAd Aggregate, available from CityMix of Seattle, Wash., may be used as the SSA constituent.

As noted above, in one implementation, an existing base coat to which SSAs may be applied includes a Plastering Industry recognized product named PREMIER CEMENT PRODUCTS "UNO". Such is a factory pre-blended and packaged mix design meeting industry requirements that allows the application of the base coat to not only be applied in a traditional scratch and brown manner with cure days in between applications, but in addition formulated to allow simultaneous application of both base coats, as per ASTM C926 or more current codes, such as CBC Section 2512.

In one example, in such an existing base coat, SSAs were incorporated by volumes of 20%-70% into the mix specified, e.g., 50%, creating a light-weight base coat by the reduction of typical aggregates. Thus, based on the volume of the SSA used, a ratio of the Portland cement, lime, and approved sand, may then be formulated to meet approved code requirements.

EXAMPLE

In the creation of a light weight base coat with a total unit weight of about 100 lbs, approximately 50% of the sand may be replaced by SSAs, to approximately 50% of volume, to create a base coat that by weight is approximately 33% less. In other words, 50% of the sand is removed, and then an equivalent (by volume) amount of SSAs are included in the cementitious base coat. The equivalent (by volume) amount of SSAs included is equivalent to the amount of volume of sand removed.

The addition of the SSA into the formulated adjusted cementitious base coat allows the end user (plasterer) to apply a base coat that is less in weight while at the same time realizing no loss of yield (yardage) per bag. Based on the percentage of the SSA used, traditionally used base coats can now be up to 70% lighter in weight.

The table below indicates partial results of this exemplary study:

|  | Before | After |
|---|---|---|
| Aggregate (Sand and/or SSA) Weight | 63 | 30 |
| Binder (Cement and Lime) Weight | 37 | 37 |
| Total Weight | 100 | 67 |

Materials according to present principles may be formulated and produced to require only the addition of water such as potable water, mixed in an industry approved manner, such as in a conventional mixer, for the application to the wall by hand or by machine (pump).

Variations:

While in the above example SSAs replaced 50% of the aggregate by volume, i.e., sand, in other implementations a greater or lesser percentage may be employed. For example, the SSAs may replace between 20% and 70% of the sand aggregate, e.g., between 30% and 60%, e.g., between 40% and 55%, e.g., 50%. Variations in ratios used in the combination of SSA, cement, sand, in an approved mix, may create a greater insulative quality wall versus traditional base coat.

Benefits in weight will be clear by consideration of the relative densities or weights of the constituent components. For example, a first aggregate of sand may weigh, e.g., 94 pounds per cubic foot. The SSA constituent component is added by volume, and yet the same may weigh, e.g., 1-4 pounds per cubic foot, such as 1-3 pounds per cubic foot or 1-2 pounds per cubic foot. 1.5 pound per cubic foot is expected to be for a general application.

Figure 3:
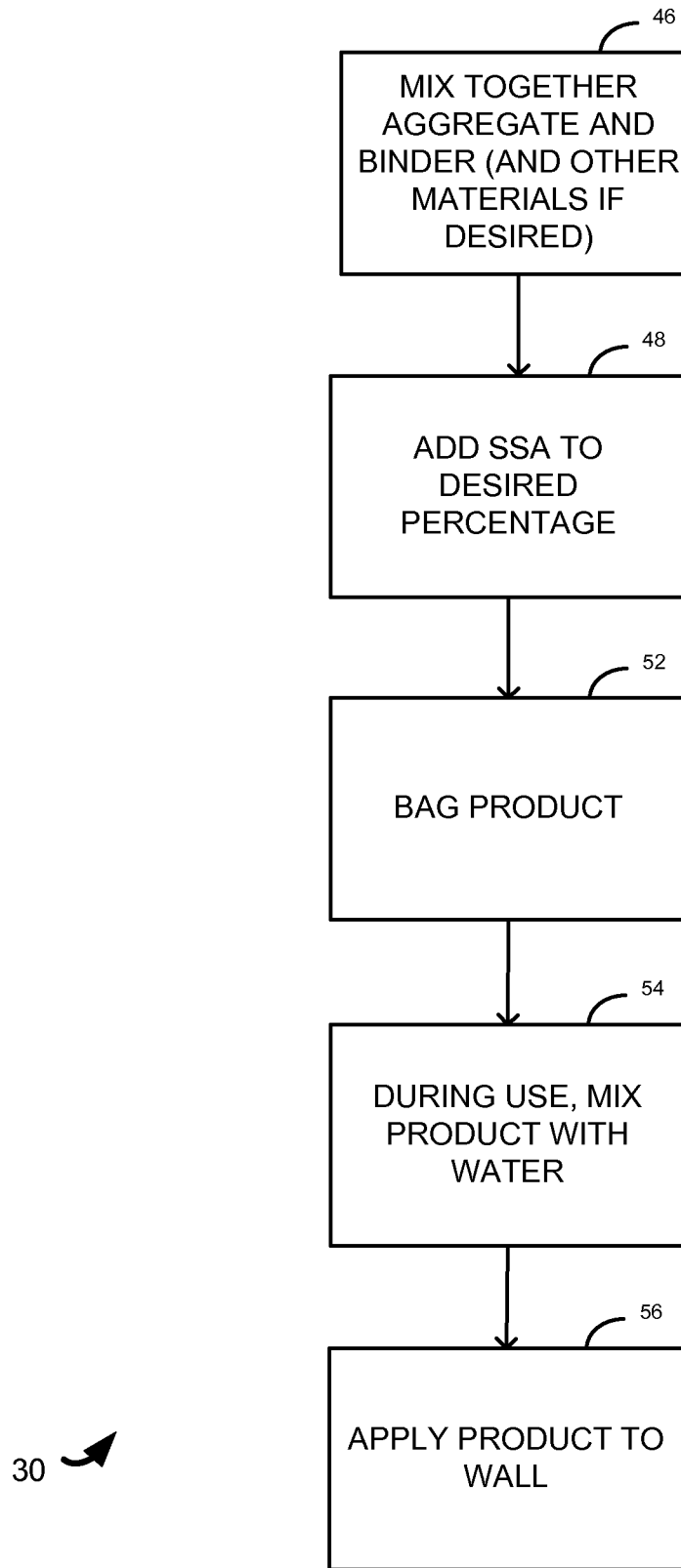
FIG. 3 is a flowchart according to present principles.

Referring to the method of making the product illustrated by the flowchart 30 of FIG. 3, in a first step an aggregate and a binder are mixed together (step 46). For example, the aggregate may be sand and the binder may be cement. Other materials such as lime may also be included in this initial mixture.

SSAs may then be added to the mixture to the desired percentage, e.g., 50% (step 48). In an alternative implementation, SSAs may be added to the initial mixture in step 46.

The product may then be bagged (step 52). Transport of such bags may be greatly enhanced by the lessened weight of products including SSAs. For example, while prior bags may have weighed 100 pounds, in the example described above, the bag would weigh just 67 pounds.

When the product is used, the same is mixed with water using a mixing techniques disclosed above (step 54). The product may then be applied to the wall (step 56), again in a manner as described above.

It will further be understood that variations to the above are within the scope of the invention. For example, while potable water is noted, and the same generally being clean, drinkable water, other types of water, with different values of purity, may also be employed, so long as the same meet the resulting plaster industry standards. It is believed the invention would be advantageous in most if not all fast setting and most if not all cement base coats. Implementations of the invention may also see applications in the tile and masonry trades. Systems, materials, and methods according the present principles may also be advantageously employed in insulation materials.

The invention claimed is:

1. A method of using a lightweight plaster, the method comprising:
   a. performing a first step of making a lightweight plaster by providing a mixture of a first aggregate constituting between about 40 and 70% by weight of a plaster product, a binder constituting between about 20 and 40% by weight of the plaster product, and a synthetic substitute aggregate occupying a same amount by volume of an amount of the first aggregate plus or minus 10%;
   b. performing a second step of making a lightweight plaster by mixing together in a mixer a product of step (a) with water;
   c. applying the lightweight plaster as a coating to a vertical wall including a lath, lattice, or other substrate, to a thickness of about ⅜" to ⅞", such that the lightweight plaster acts as a base coat to plumb the vertical wall and to create a base to receive a finish coat application, the finish coat application being a stucco or acrylic synthetic finish or finish coat; and
   d. applying the finish coat application onto the lightweight plaster coating.

2. The method of claim 1, wherein the synthetic substitute aggregate includes expanded polystyrene.

3. The method of claim 1, wherein the binder includes Portland cement.

4. The method of claim 3, wherein the binder further includes lime.

5. The method of claim 1, wherein the first aggregate includes sand and further includes a material selected from the group consisting of: calcium carbonate, silica, quartz, and combinations thereof.

6. The method of claim 1, wherein the amount of the first aggregate and the amount of the synthetic substitute aggregate occupy equal volumes within the plaster product plus or minus 5%.

* * * * *